US008466915B1

(12) United States Patent
Frueh

(10) Patent No.: US 8,466,915 B1
(45) Date of Patent: Jun. 18, 2013

(54) FUSION OF GROUND-BASED FACADE MODELS WITH 3D BUILDING MODELS

(75) Inventor: Christian Frueh, Mountain View, CA (US)

(73) Assignee: Google Inc., Mountain View, CA (US)

( * ) Notice: Subject to any disclaimer, the term of this patent is extended or adjusted under 35 U.S.C. 154(b) by 432 days.

(21) Appl. No.: 12/815,880

(22) Filed: Jun. 15, 2010

(51) Int. Cl.
*G06T 17/00* (2006.01)

(52) U.S. Cl.
USPC .......................................................... 345/420

(58) Field of Classification Search
None
See application file for complete search history.

(56) References Cited

PUBLICATIONS

C. Dorai et al., Registration and Integration of Multiple Object Views for 3D Model Construction, IEEE Transactions on Pattern Analysis and Machine Intelligence, vol. 20, No. 1, Jan. 1998, pp. 83-89.*
C. Früh and A. Zakhor, Constructing 3D City Models by Merging Aerial and Ground Views, IEEE Computer Graphics and Applications, Nov./Dec. 2003, pp. 52-61.*
Akbarzadeh, A., et al., "Towards Urban 3D Reconstruction From Video", *Proceedings of the Third International Symposium on 3D Data Processing, Visualization and Transmission*, Chapel Hill, USA, Jun. 2006; pp. 1-8.
Frueh, C., "Automated 3D Model Generation for Urban Environments", Ph.D. Thesis, University of Karlsruhe, 2002; 177 pages.
Frueh, C., et al., "Constructing 3D City Models by Merging Ground-Based and Airborne Views", *IEEE Computer Graphics and Applications*, Nov./Dec. 2003; pp. 52-61.
Frueh, C., et al., "Data Processing Algorithms for Generating Textured 3D Building Façade Meshes From Laser Scans and Camera Images", *Proceedings of the 3D data Processing, Visualization and Transmission 2002*, Padua, Italy, Jun. 2002; pp. 834-847.

* cited by examiner

*Primary Examiner* — Kee M Tung
*Assistant Examiner* — Haixia Du
(74) *Attorney, Agent, or Firm* — Marshall, Gerstein & Borun LLP

(57) ABSTRACT

Systems and methods for fusing three-dimensional (3D) ground and airborne models for a geographical information system are described herein. A method embodiment includes aligning the ground and airborne models relative to one another, modifying three-dimensional mesh information in the ground and airborne models after the aligning to obtain modified ground and airborne models, merging the modified ground and airborne models to obtained a fused 3D model and storing the fused 3D model in memory for subsequent access by the geographical information system. A system embodiment includes a 3D model fuser configured to align the ground and airborne models relative to one another, modify three-dimensional mesh information in the ground and airborne models after the aligning to obtain modified ground and airborne models, and merge the modified ground and airborne models to obtained a fused 3D model, and a storage device that stores the fused 3D model for subsequent access by the geographical information system.

15 Claims, 14 Drawing Sheets

"Consensus points", i.e. the sample points that are within ε-distance of the line 3rd facade

FUSION OF GROUND-BASED FACADE MODELS WITH 3D BUILDING MODELS

BACKGROUND

1. Field

The field relates to modeling for geographic information systems and services.

2. Background Art

Geographic information systems (GISs) are computer systems that provide an ability to store and to display spatial data. Geographic information systems often allow users to view, display, or navigate through environments that include spatial data. Spatial data can be any type of data relating to location including, but not limited to, maps, terrain, satellite imagery, photographic imagery, and/or other geographical information. Annotation, models, and other images, such as photographic images, can also be added to spatial data to enrich the environment and enhance user experience.

Increasingly, it is desirable to provide even richer three-dimensional (3D) detail and imagery in GIS environments. One way is to add 3D models to a GIS. 3D models can be manually made or custom-made with modeling creation and editing tools; however, adding enough detail is expensive and time consuming. Thus, manually created 3D models for use in large online geographical information systems like Google Earth made available by Google Inc. or Virtual Earth made available by Microsoft Inc., are typically created from low-resolution data such as airborne imagery only.

One way to create 3D models, textured or untextured, is to automatically generate 3D models from airborne imagery and/or Lidar data. Like the manually created models mentioned before, such 3D models may be useful for flythroughs, but not for walk- or drive-throughs because of their low resolution. As used throughout the description herein, the term "airborne" model means any 3D model that has a resolution lower than that of ground-based data, including, but not limited to, models actually created from airborne data such as imagery, or models created by hand from CAD drawings, with the Google SketchUp tool, or the like.

On the other hand, 3D models can be created from ground-based views with very high texture and geometry-resolution, but may lack rooftops or back sides of buildings making them less attractive or undesirable in many GIS environments. See further description at C. Frueh and A. Zakhor, "Data Processing Algorithms for Generating Textured 3D Building Facade Meshes From Laser Scans and Camera Images", in Proc. 3D Data Processing, Visualization and Transmission 2002, Padua, Italy, June 2002, p. 834-847; and A. Akbarzadeh, J.-M. Frahm, P. Mordohai, B. Clipp, C. Engels, D. Gallup, P. Merrell, M. Phelps, S. Sinha, B. Talton, L. Wang, Q. Yang, H. Stewenius, R. Yang, G. Welch, H. Towles, D. Nister and M. Pollefeys, Towards Urban 3D Reconstruction From Video, Proc. 3DPVT'06 (Int. Symp. on 3D Data, Processing, Visualization and Transmission), 2006.

One way to automate 3D model creation is to fuse airborne and ground models. Attempts have been made to fuse airborne and ground-based models but these have limitations. See further description at C. Frueh and A. Zakhor, "Constructing 3D City Models by Merging Ground-Based and Airborne Views", in IEEE Computer Graphics and Applications, Special Issue November/December 2003, pp. 52-61; and C. Frueh, "Automated 3D Model Generation for Urban Environments", Ph.D. Thesis, University of Karlsruhe, 2002. First, alignment of the models was done by correcting the vehicle pose with respect to airborne data, which does not work if the individual airborne models are not consistent with respect to each other (e.g., when an overhanging roof causes the street canyons to appear narrower for the airborne models). In these earlier approaches to fusion, removal of duplicate airborne facades was done by marking a Digital Surface Model (DSM) and omitting airborne geometry for marked areas upon model creation. This is not applicable for any model not created from DSMs. Even for models created from DSMs it creates a process flow dependency since the ground-based models would always need to be created first. Also, removal under this approach is typically inaccurate due to limited DSM resolution and the presence of foreground objects. Finally, re-triangulation and hole closing in this approach was done with a blend mesh which resulted in a substantial increase in triangle count.

What is needed is a way to create 3D models having improved resolution even more easily. Further, an improved way of fusing airborne and ground based models is needed.

BRIEF SUMMARY

Embodiments relate to fusing ground-based and lower-resolution models to obtain a fused 3D model. In one aspect, fused 3D models are created by combining a ground-based view of relatively high resolution with existing 3D models created from relatively lower-resolution airborne views.

In one embodiment, a computer-implemented method for fusing three-dimensional (3D) ground and airborne models for a geographical information system is provided. The method includes aligning the ground and airborne models relative to one another. After the aligning, the method includes modifying three-dimensional mesh information in the ground and airborne models to obtain modified ground and airborne models, and merging the modified ground and airborne models to obtain a fused 3D model. A step of storing the fused 3D model in memory for subsequent access by the geographical information system is provided.

In another embodiment, a system for fusing three-dimensional (3D) ground and airborne models for a geographical information system is described. The system includes a 3D model fuser and storage device. The 3D model fuser is configured to align the ground and airborne models relative to one another, modify three-dimensional mesh information in the ground and airborne models after the aligning to obtain modified ground and airborne models, and merge the modified ground and airborne models to obtain a fused 3D model. The storage device stores the fused 3D model for subsequent access by the geographical information system.

In another embodiment, a computer-implemented method for fusing three-dimensional (3D) models having different resolutions, at least one 3D model having a relatively lower resolution than another 3D model, for a geographical information system is provided. The method includes aligning the 3D models of different resolutions relative to one another; modifying three-dimensional mesh information in the 3D models after the aligning to obtain modified models; merging the modified models to obtain a fused 3D model; and storing the fused 3D model in memory for subsequent access by the geographical information system.

Further embodiments, features, and advantages of this invention, as well as the structure and operation and various embodiments of the invention, are described in detail below with reference to accompanying drawings.

BRIEF DESCRIPTION OF THE DRAWINGS/FIGURES

Embodiments are described with reference to the accompanying drawings.

In the drawings, like reference numbers may indicate identical or functionally similar elements. The drawing in which an element first appears is generally indicated by the left most digit in the corresponding reference number.

DETAILED DESCRIPTION OF EMBODIMENTS

Systems and methods for fusing 3D models of differing resolution, including but not limited to three-dimensional (3D) ground and airborne models, for a geographical information system are provided. Embodiments provide a way to create 3D models having improved resolution even more easily. Further, an improved way of fusing airborne and ground based models is described. One feature of embodiments is to combine ("fuse") 3D models of relatively high resolution created from a ground-based view with 3D models created from lower-resolution airborne views. In this way, a fused model may be obtained where high-resolution ground-based model parts are chosen and used instead of, or are visible in front of, any relatively low-resolution airborne geometry.

In one aspect embodiments uniquely fuse two different model modalities, and combine the advantages of both models. The resulting 3D models obtained by the inventor have both high resolution for the areas that were visible from the ground level, but also the completeness (roof, back sides) of airborne models.

As used throughout the description of embodiments herein, the term "airborne" model means any 3D model that has a resolution lower than that of ground-based data, including, but not limited to, models actually created from airborne data such as imagery, or models created by hand from CAD drawings, with the Google SketchUp tool, or the like.

Figure 1:
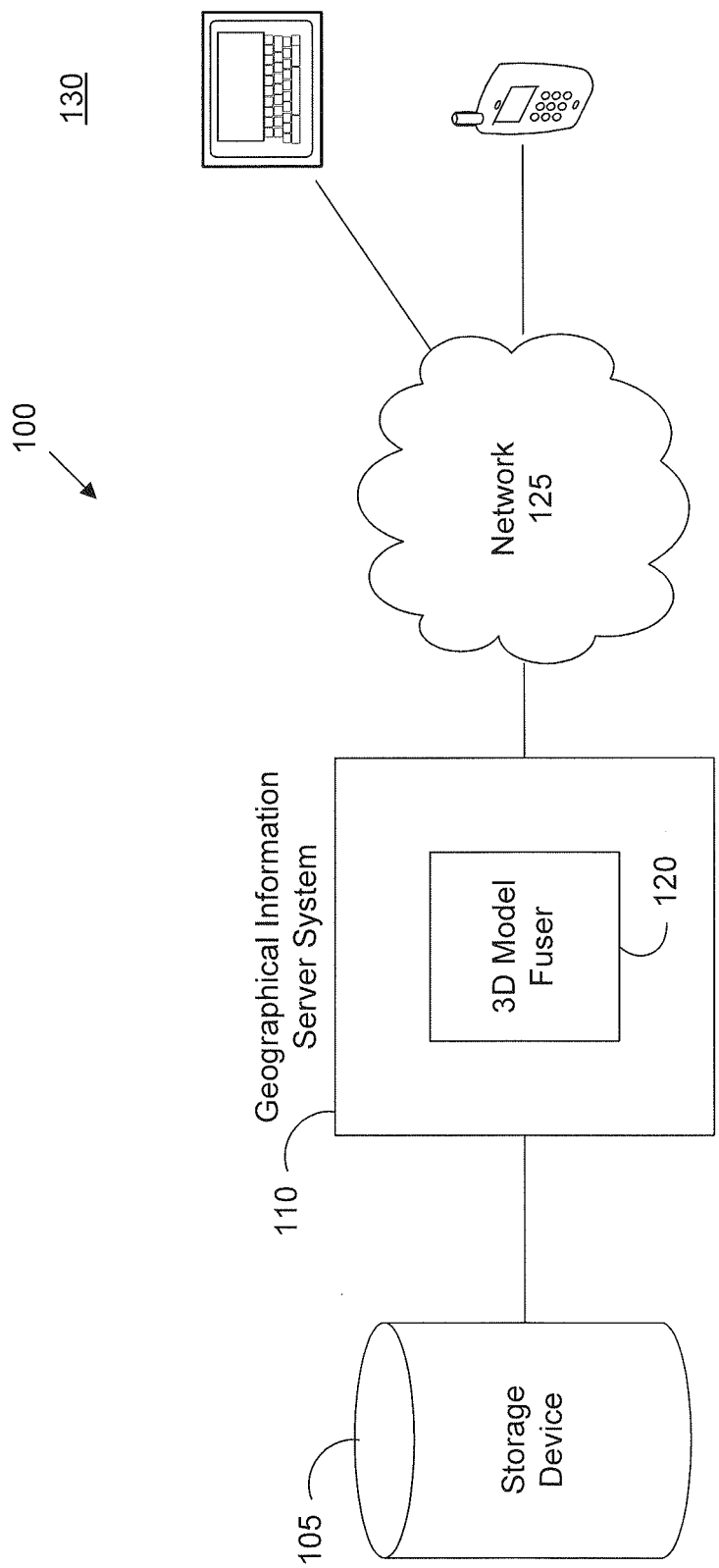
FIG. 1 is a diagram of a system for fusing three-dimensional (3D) ground and airborne models for a geographical information system according to an embodiment.

FIG. 1 is a diagram of a system 100 for fusing three-dimensional (3D) ground and airborne models for a geographical information system according to an embodiment. System 100 includes a geographical information server system 110 coupled between a storage device 105 and one or more network(s) 125. Geographical information server system 110 includes a 3D model fuser 120. One or more users can also access the geographical information system 100 through one or more client devices 130 coupled to network(s) 125.

3D model fuser 120 is configured to align ground and airborne models relative to one another, modify three-dimensional mesh information in the ground and airborne models after the aligning to obtain modified ground and airborne models, and merge the modified ground and airborne models to obtain a fused 3D model. Storage device 105 stores the obtained fused 3D model for subsequent access by the geographical information system. For instance, remote users at client devices 130 can view, display, and/or navigate through environments of spatial data served by geographical information server system 110 including spatial data with data drawn from the fused 3D model stored in storage device 105. For brevity the operation of 3D model fuser 120 is further described with respect to method 200 below.

Geographical information server system 110 and 3D model fuser 120 can be implemented in software, firmware, hardware, or a combination thereof. Geographical information server system 110 and 3D model fuser 120 can be implemented on one or more computing devices. A computing device can be any type of device having one or more processors. For example, a computing device can be a workstation, mobile device (e.g., a mobile phone, personal digital assistant, tablet or laptop), computer, server, compute cluster, server farm, game console, set-top box, kiosk, embedded system or other device having at least one processor and memory. Geographical information server system 110 and 3D model fuser 120 can also be implemented on different computing devices, and can each have their functionality distributed across different computing devices depending upon a particular implementation.

Storage device 105 can be any type of storage device including, but not limited to, memory. In one example, storage device 105 may store airborne models and ground models in a database in structured memory, such as, a relational database stored in persistent memory on one or more devices.

Network(s) 125 can be any type of data or computer network or, combination networks including, but not limited to, the Internet, a local area network, and/or wide-area network. System 100 can also include support for applications and services including World Wide Web applications and services suitable for geographical information.

Figure 2:
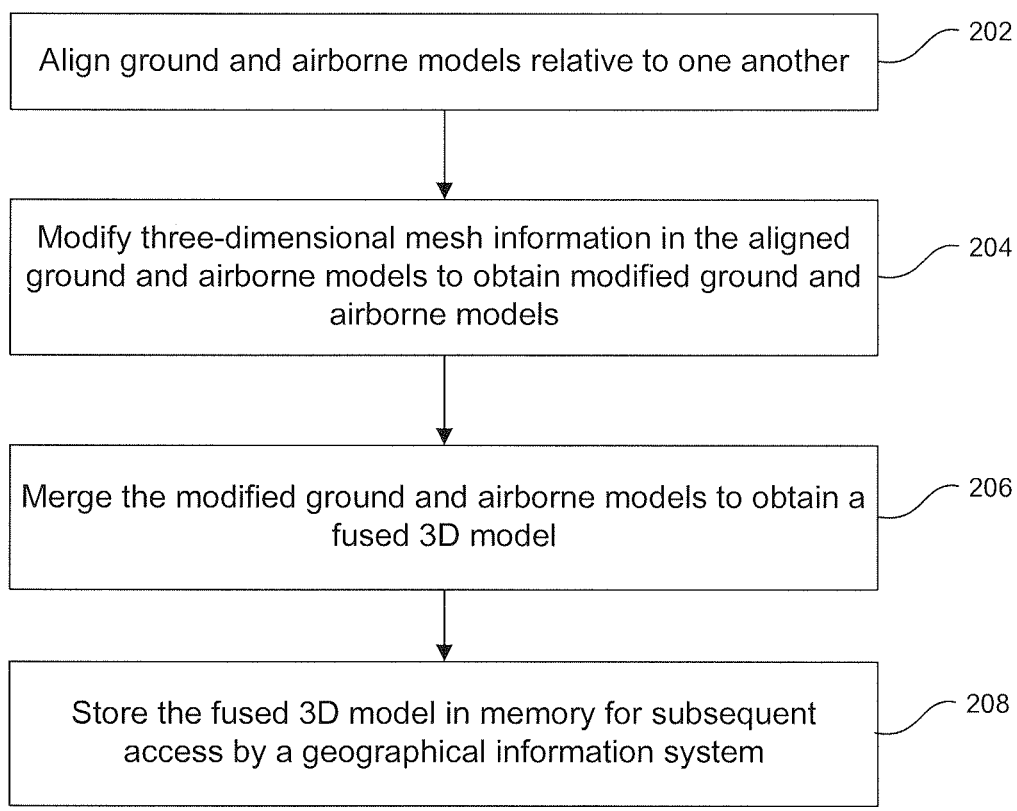
FIG. 2 is a flowchart diagram of a method for fusing three-dimensional (3D) ground and airborne models for a geographical information system according to an embodiment.

FIG. 2 is a flowchart diagram of a method 200 for fusing three-dimensional (3D) ground and airborne models for a geographical information system according to an embodiment (steps 202-208). For brevity, method 200 is described with respect to system 100 but is not intended to necessarily be limited to system 100. In an embodiment, 3D model fuser 120 carries out each of the steps 202-206, and communicates with storage device 105 to carry out storing step 208. Method 200 is also described with respect to examples in FIGS. 3A-3G, and 4A, 4B, 5A and 5B which are illustrative and not intended to be limiting.

Initially, two separate ground and airborne models are stored or received. In one example the initial ground and airborne models are both 3D models of spatial data. These can be 3D models including images of any type of object including, but not limited to, objects on a landscape or terrain, such as, buildings, bridges, landmarks, or other man-made or naturally occurring objects having a facade with an edge. In one feature, the initial ground model has images at a relatively higher resolution than the initial airborne model. In examples, not intended to limit the present invention, a ground model (also called a ground based model) may be a model having many images obtained from a point view at or near a ground or street such as from a camera or set of cameras on a vehicle or person traveling along or near the ground. An airborne model (also called an airborne based model) may be a model having many images obtained from a point view located well above ground level such as an aerial view from a camera or set of cameras on a plane or balloon traveling above the height of buildings. Ground models and airborne models can each be 3D models and may include 3D mesh information. The 3D mesh information may include primitives (e.g., polygons, triangles, etc.) with vertices and attributes that make up the 3D model data. 3D model data may also include images, textures, and non-textured data. Ground 3D models may often include relatively high resolution images of facades and optional depth or distance data, such as obtained with laser scanning. Airborne 3D models may often include relatively low resolution images of facades. For example, in many applications, ground-based 3D models may have facade images with resolution values of about 50-70 pixels/meter, and airborne 3D models may have facade images with resolution values of about 4-8 pixels/meter. These examples and resolutions are illustrative and not intended to limit the present invention.

Aligning

In step 202, ground and airborne models are aligned relative to one another (also called registration). This aligning includes first determining misalignment between a first facade of an airborne model and a corresponding first facade of a ground model, and then moving the airborne model and the ground model relative to one another to align the two first facades. This aligning is repeated for successive facades. Namely, misalignment is determined between successive facades of the airborne model and respective successive facades of the ground model, and the airborne model and the ground model are additionally moved relative to one another to align the successive facades.

For example, facades in the airborne model and ground model may each have a surface with a top and a bottom relative to a ground location, and at least two vertical edges extending between the top and bottom that define endpoints across the facade. The surface may represent a side of a building, for example, the top being where the building side meets the roof of the building and the bottom being where the building side meets a street or sidewalk. Vertical edges of the building side may represent edges of the building. In this example, the aligning in step 202 includes extracting vertical edges of facades from both the airborne model and the ground model, determining misalignment between the edges, and moving the edges to align the two facades at the edges. In one example, endpoints of vertical edges of facades of the ground model are moved to optimize a consensus score measuring congruence between the extracted vertical edges of facades of the airborne model and the ground model.

Figure 3A:
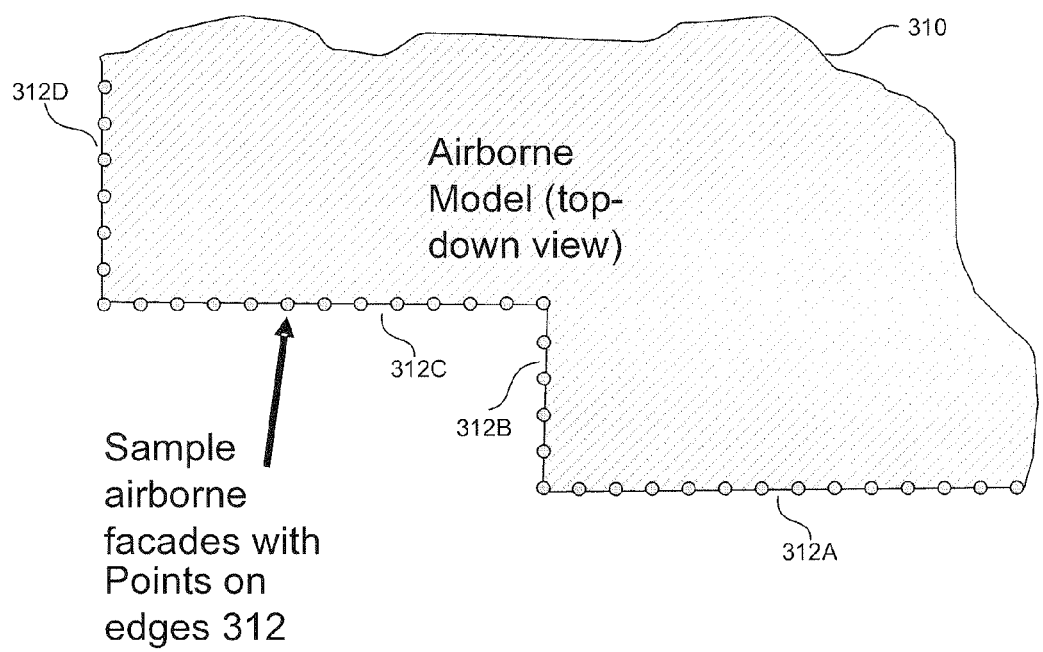
FIGS. 3A-3F are diagrams illustrating an example aligning of ground and airborne models.
Figure 3B:
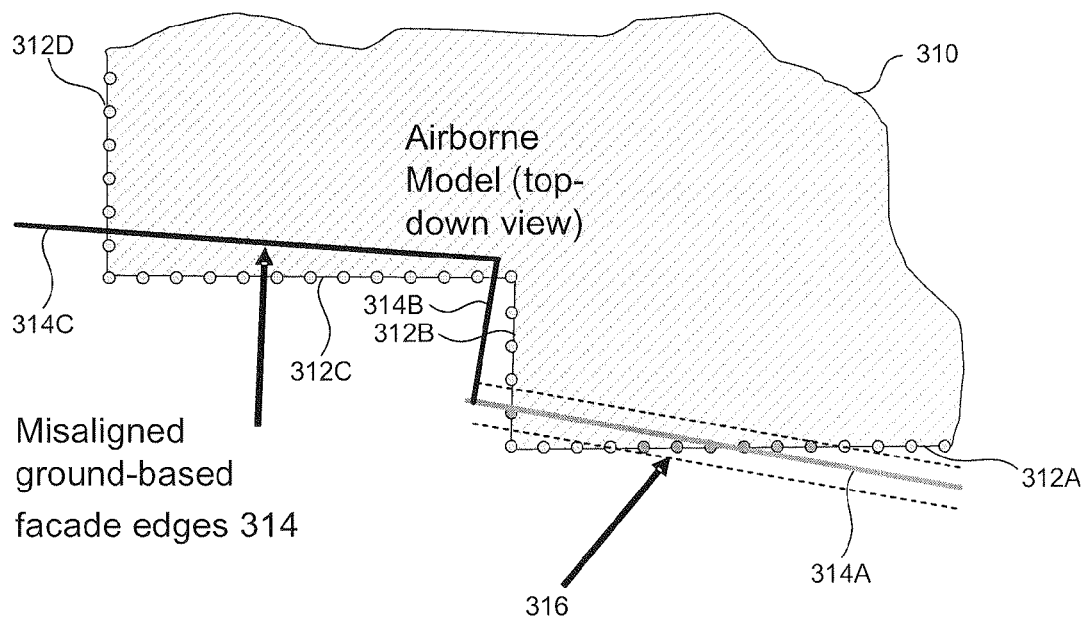
Figure 3C:
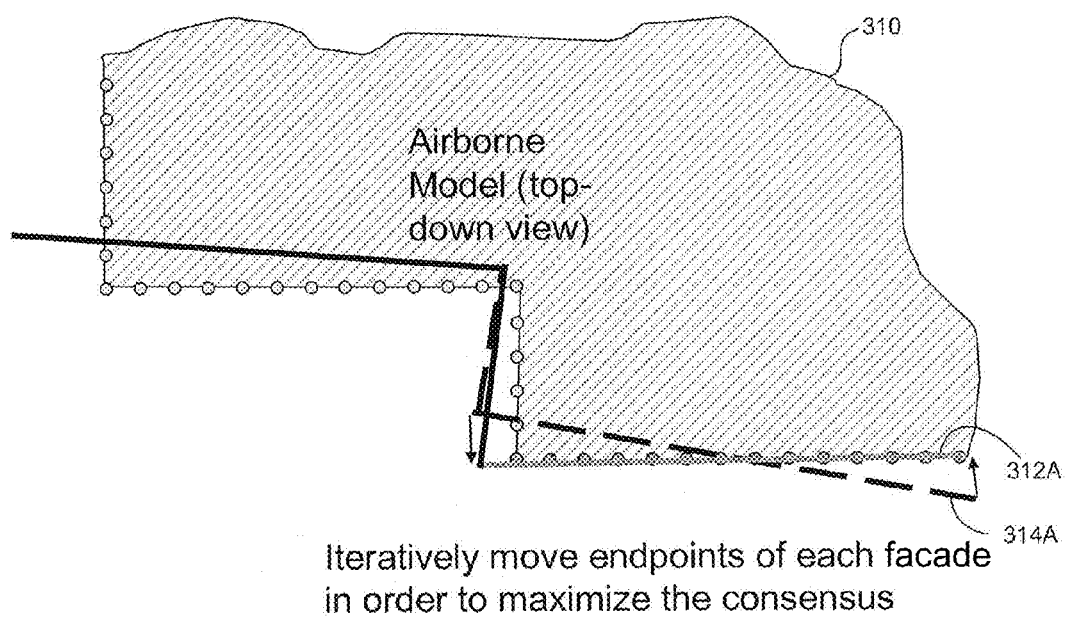

FIGS. 3A-3F are diagrams illustrating such an example of aligning ground and airborne models. FIG. 3A shows a top-down view of facades of a section 310 of an airborne model. The top edges of the facades are sampled at different points along the edges. FIG. 3B further shows a misalignment determined to be between corresponding ground model facades (represented with a solid line) and the facades of the airborne model. For a first facade, a set of consensus points 316 along edge 312A of the airborne model are determined. The consensus points 316 are those points on edge 312A determined to be within a predetermined distance of the ground facade edge 314A. Next, the endpoints of edge 312A, and with them all other edges connected at those endpoints, are moved until the consensus score of all affected edges combined is maximal. As shown by the arrow in FIG. 3C this results in a shifting of the ground model relative to the airborne model such that the edges 312A, 314A are better aligned. In one implementation, when carrying out the aligning, first vertical edges are extracted from both the airborne 3D model and the ground facade model. Then, the endpoints of edges of the ground-based facade models are moved until a consensus score that measures how well the ground-based edges are congruent with the airborne edges is maximal. This consensus score is based on sampling the airborne edges to points and counting how many points are within close range of ground-based edges for a given endpoint position. The altitude and slope of the two models are subsequently aligned by adjusting their bottom points to a terrain data base.

Figure 3D:
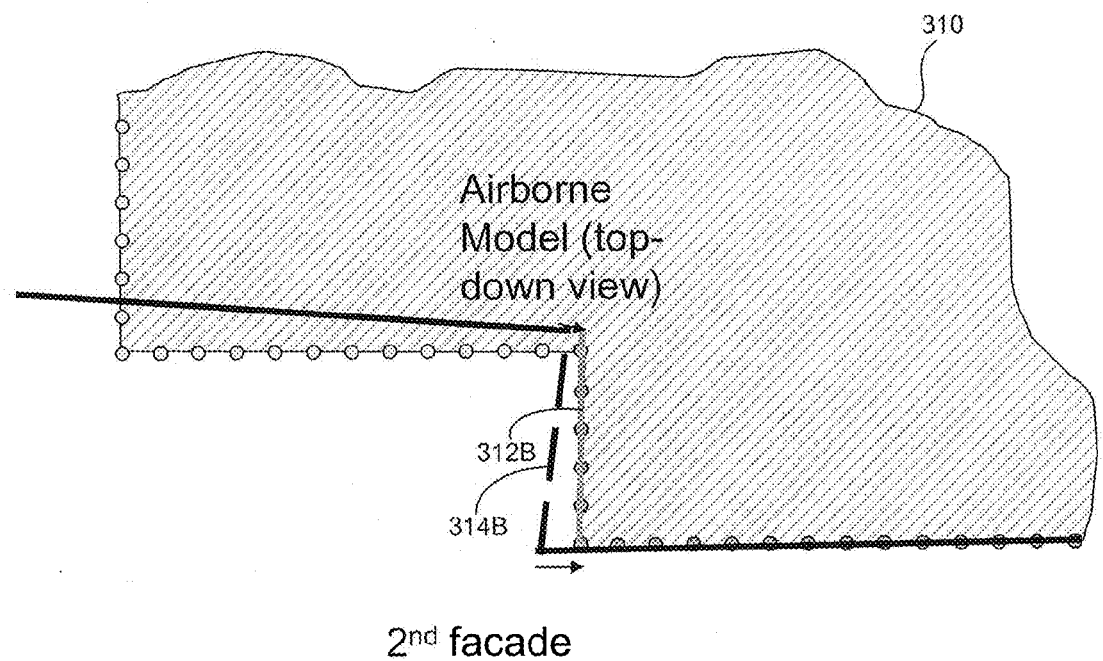
Figure 3E:
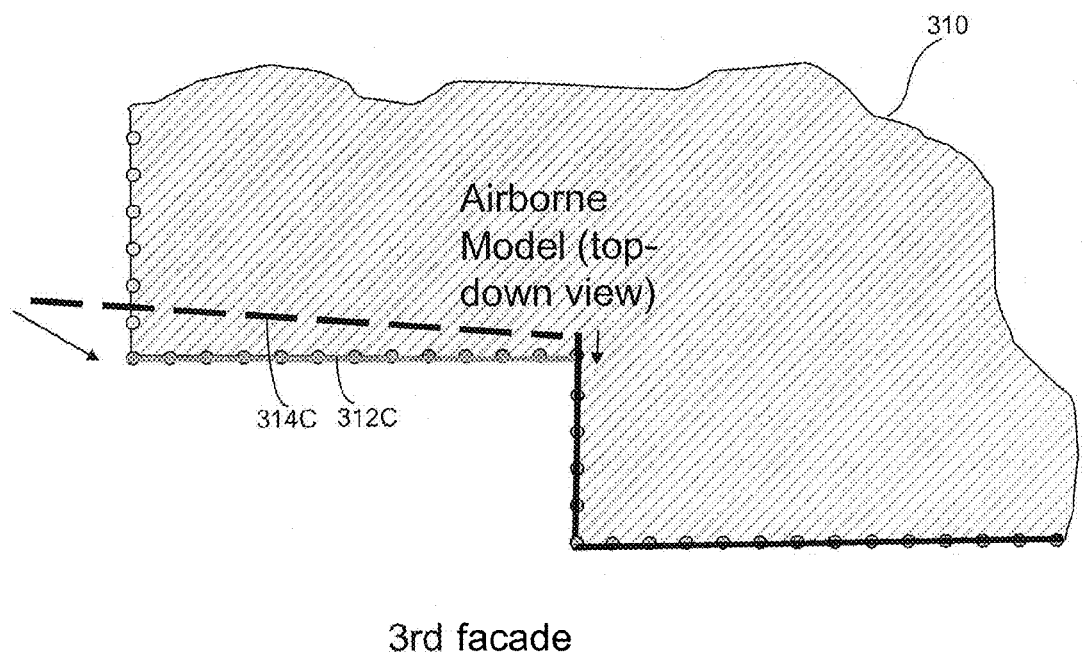
Figure 3F:
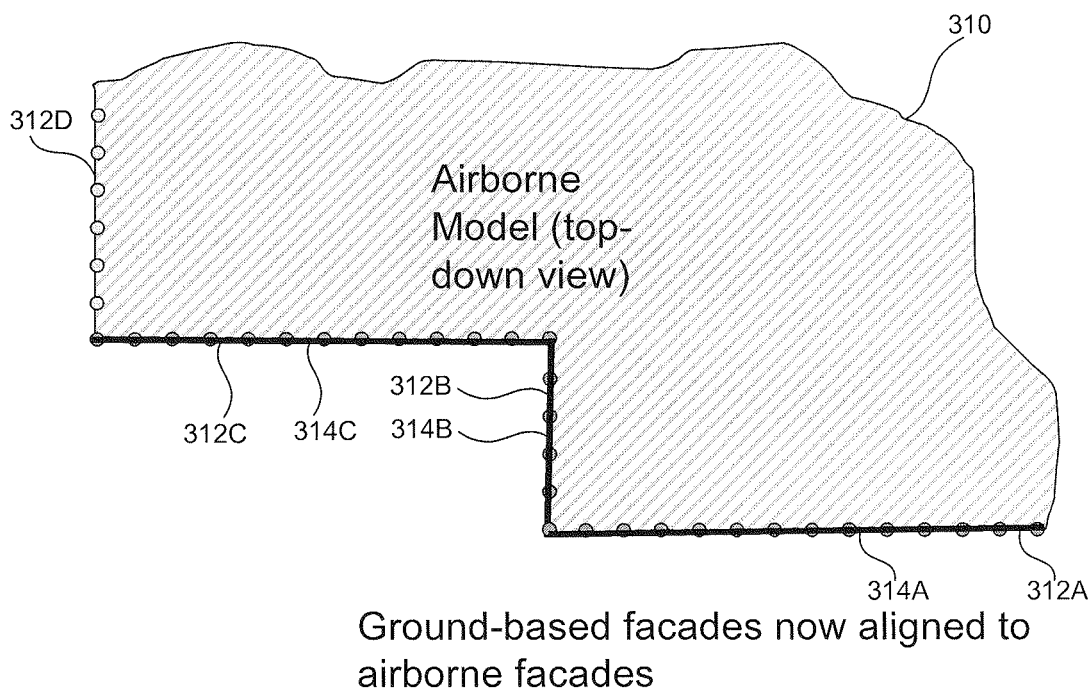

This process is then repeated for the second facade so that the ground model is further shifted relative to the airborne model, as shown by the arrow in FIG. 3D, such that the edges 312B, 314B are better aligned and the consensus score is optimized. Next, the process is repeated for a third facade so that the ground model is further shifted relative to the airborne model, as shown by the arrow in FIG. 3E, such that the edges 312C, 314C are better aligned and the consensus score is further optimized. This process can continue for additional facades if present, such as the next successive edge 314D, or can be stopped if the misalignment no longer is present or is sufficiently small. See, FIG. 3F which shows the example where the facade top edges 312A-C of the airborne model and 314A-C of the ground model are finally aligned.

The aligning in step 202 of top edges of facades is an example and not intended to be limiting as other edges or areas of a facade may be used. Also, once top or above ground edges area aligned, the aligning in step 202 may further comprise adjusting bottom points of the ground and airborne models relative to terrain data of the geographical information system to align the altitude and slope of ground and airborne models.

Modifying

After the aligning, in step 204, three-dimensional mesh information in the aligned ground and airborne models is modified to obtain modified ground and airborne models. This modifying of mesh information can include changing primitives in the mesh information (i.e., deleting, adding, or modifying primitives), changing vertices of primitives (i.e., altering position values), or changing attributes of primitives (i.e., changing color, intensity, texture, or transparency) to further improve the quality of the mesh information or reduce the size of mesh information to enhance user experience over a network.

In one feature, modifying in step 204 may include removing unmatched ground-based geometry. For instance, this removing may include identifying geometry in a ground model that does not match edges of an airborne model, and removing the identified geometry from mesh information in the ground model. For example, ground-based geometry that could not be matched to the edges of a particular airborne building model may be removed. This eliminates unwanted geometry such as trees or buses, and eliminates ground-based facades not pertaining to a particular airborne model. The latter case occurs when the ground-based and airborne model subdivision is not identical, and hence there is no 1:1 correspondence between ground-based and airborne models.

In a further feature, color or intensity adjustment may be carried out in step 204. Techniques such as color or multiband blending may be applied to mitigate discrepancies between the two ground and airborne models. For instance, the two ground and airborne models may each have texture images corresponding to the facades. In one example, for each ground-based facade texture image, the corresponding airborne texture is determined based on geometrical proximity, and then the color difference between the two images is adjusted via multiband blending. This mitigates the visibility of color seams in the resulting fused model.

Figure 3G:
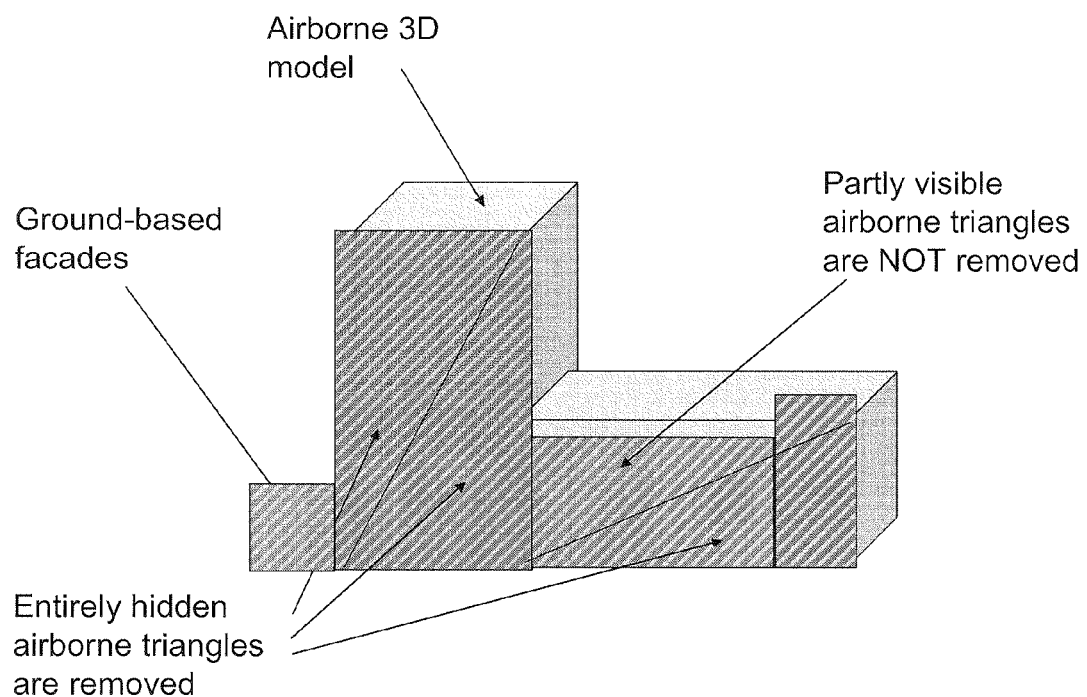
FIG. 3G is a diagram illustrating removal of redundant, hidden triangles from a facade in an example overlap of ground and airborne models.

In a still further feature, modifying three-dimensional mesh information in the ground and airborne models in step 204 may also include removing redundant airborne primitives. This removal of redundant information can reduce the amount of information that needs to be stored. For example, this removing may involve removing primitives (such as, triangles) in the mesh of the airborne model occluded by primitives in the mesh of the ground model. In one implementation, redundant airborne facade triangles are removed as follows: first, all vertical triangles whose endpoints lie on ground-based edges are determined and become candidates for removal. Then, all removal candidates are checked against the corresponding ground-based models and removed only if they are entirely occluded by the ground based models; thus, removing them will not create a hole in the final model. FIG. 3G is a diagram illustrating removal of redundant, hidden triangles from a facade in an example overlap of ground and airborne models.

Merging

Step 206 involves merging the modified ground and airborne models to obtained a fused 3D model. This merging meshes the modified ground and airborne models to a single 3D model (including re-triangulation, closing holes, and/or repacking of texture). In an example implementation with triangular primitive meshes, ground-based points and triangles are appended to the airborne points and triangles. Texture is repacked in order to reclaim unused texture space pertaining to removed triangles. Any remaining holes are either closed by moving surrounding vertices towards each other, or by filling in new triangles. Any protrusions of the airborne model through the ground-based facades can be removed, for example, via a Constructive Solid Geometry (CSG) procedure.

Storing

Finally, the fused 3D model is stored (step 208). For example, the obtained fused 3D model obtained by 3D model fuser 120 may be stored in memory in storage device 105. The obtained fused 3D model may be subsequently accessed by the geographical information server system 110 for further processing or fulfilling requests for spatial data made by client devices 130.

Figure 4A:
FIG. 4A shows an example image of an airborne 3D model prior to any fusion.
Figure 4B:
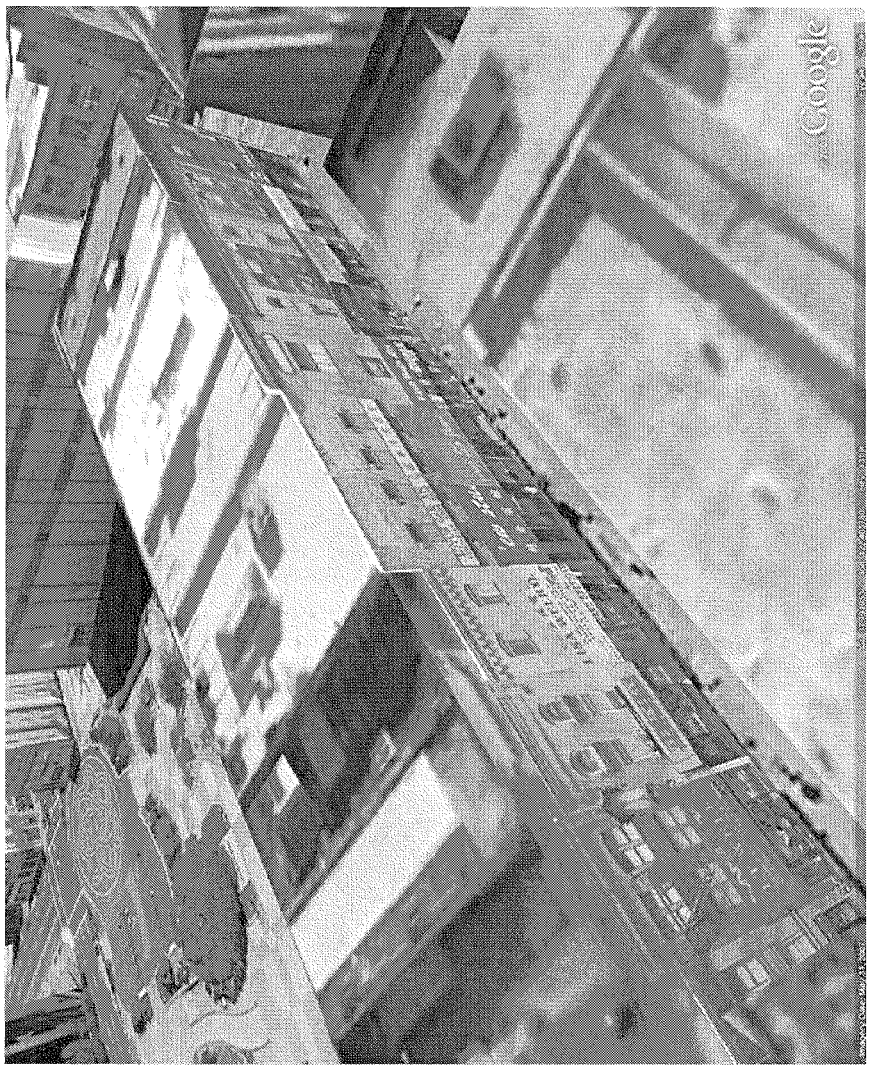
FIG. 4B shows the example image of FIG. 4A after fusion with a ground-based model according an embodiment.

The obtained fused 3D model as described herein can provide more detail and richer user experience for users of a GIS. FIG. 4A shows an example image of an airborne 3D model prior to any fusion as described herein. FIG. 4B shows the example image of FIG. 4A after fusion with a ground-based model according to an embodiment of the present invention. By inspection of the facades in FIG. 4B one can readily see the relatively higher resolution obtained in the image of FIG. 4B compared to that of FIG. 4A. Buildings and storefronts in the image of FIG. 4B are more clear and have more detail.

Figure 5A:
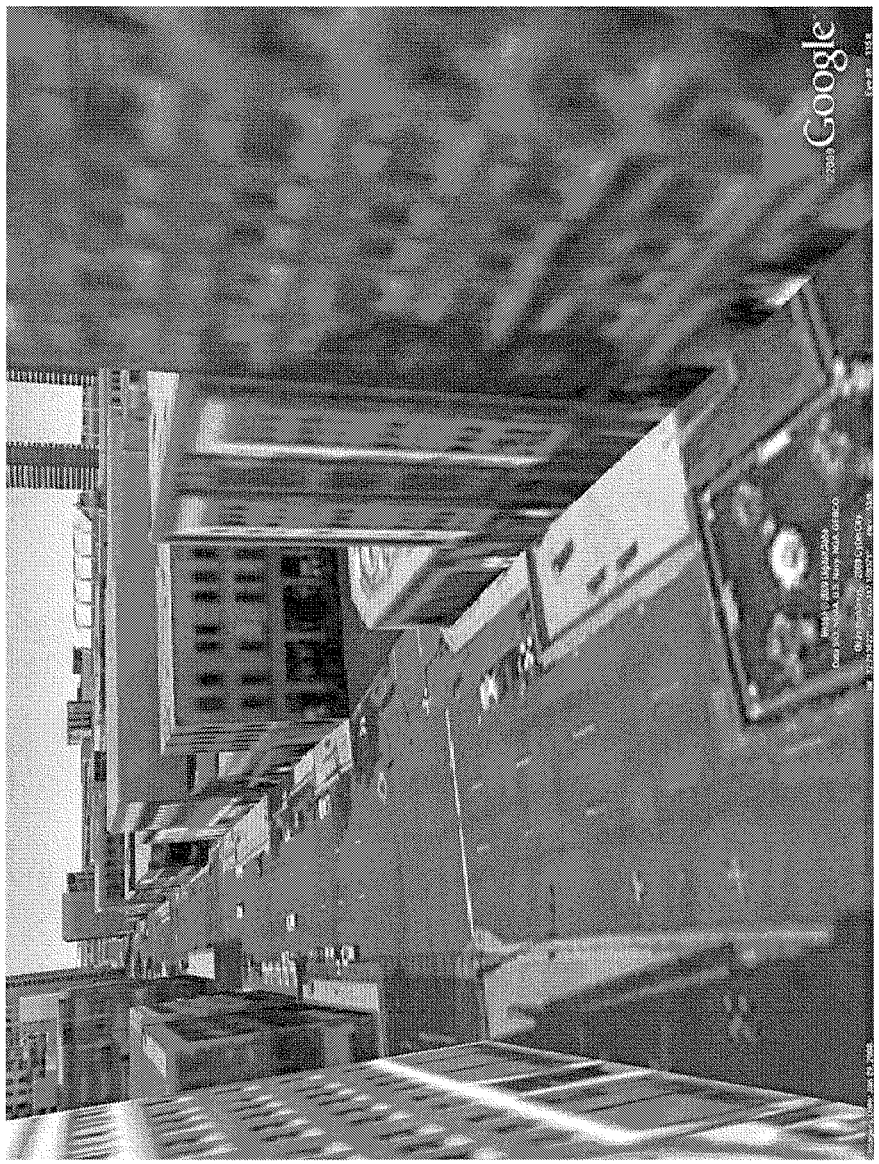
FIG. 5A shows another example image of an airborne 3D model prior to any fusion.
Figure 5B:
FIG. 5B shows the example image of FIG. 5A after fusion with a ground-based model according an embodiment.

Similarly, FIG. 5A shows another example image of an airborne 3D model prior to any fusion. FIG. 5B shows the example image of FIG. 5A after fusion with a ground-based model according an embodiment of the present invention.

Method 200 and the embodiments and examples above are illustrative and not intended to limit the present invention. Other alternatives may be used as would be apparent to a person skilled in the art given this description. For example, other scoring methods for consensus could be used, e.g. based on edge proximity and orientation. Registration could also be achieved based on using a least-square score instead of a consensus score. The alignment could also be performed by aligning the airborne model with respect to the ground based model as a reference, or by moving both models relative to each other to a common new location. Redundant interior geometry from the airborne model could also be removed by a CSG union operation. Color and intensity adjustment could be done by color multiplication factors, possibly even in a 3D client during model rendering.

Embodiments including system 100 and method 200 may be used for creating high-resolution 3D buildings in Google Earth available from Google Inc. This creation of high-resolution 3D buildings can be carried out automatically or semi-automatically as desired to generate a large volume of higher resolution content compared to airborne models alone. Other embodiments may also use this 3D model fusion for Click-to-Go navigation mode available in Google Maps StreetView available from Google Inc. These examples are illustrative and 3D model fuser 120 may be incorporated in other products and services having 3D models with access to low-resolution 3D models and terrestrial image and/or laser data. Further applications for the fused 3D model as obtained here are web-based mapping and search, flight simulators, urban planning, mission planning, as well as virtual and augmented reality.

EXAMPLE COMPUTER EMBODIMENT

Figure 6:
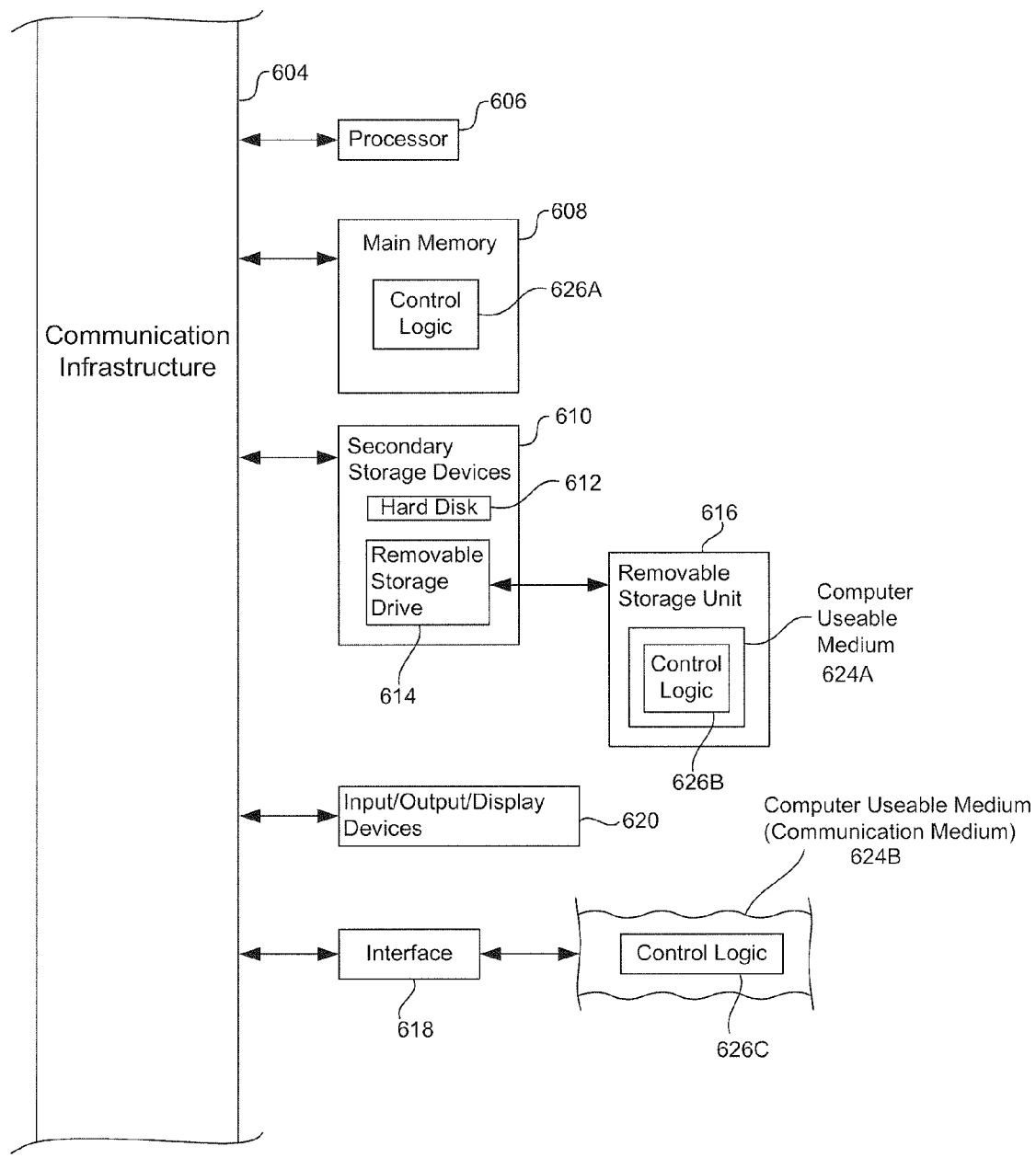
FIG. 6 shows an example computer system that may be used according to an embodiment.

In an embodiment, the system and components of embodiments described herein are implemented using well known computing devices, such as the example computer 602 shown in FIG. 6. For example, geographical information server system 110 and 3D model fuser 120 can be implemented in software, firmware, hardware, or a combination thereof on one or more computer(s) 602.

The computer 602 can be any commercially available and well known computer capable of performing the functions described herein, such as computers available from International Business Machines, Apple, Sun, HP, Dell, Compaq, Cray, etc.

The computer 602 includes one or more processors (also called central processing units, or CPUs), such as a processor 606. The processor 606 is connected to a communication infrastructure 604.

The computer 602 also includes a main or primary memory 608, such as random access memory (RAM). The primary memory 608 has stored therein control logic 626A (computer software), and data.

The computer 602 also includes one or more secondary storage devices 610. The secondary storage devices 610 include, for example, a hard disk drive 612 and/or a removable storage device or drive 614, as well as other types of storage devices, such as memory cards and memory sticks. The removable storage drive 614 represents a floppy disk drive, a magnetic tape drive, a compact disk drive, an optical storage device, tape backup, etc.

The removable storage drive 614 interacts with a removable storage unit 616. The removable storage unit 616 includes a tangible computer useable or readable storage medium 624A having stored therein computer software 626B (control logic) and/or data. Removable storage unit 616 represents a floppy disk, magnetic tape, compact disk, DVD, optical storage disk, or any other computer data storage device. The removable storage drive 614 reads from and/or writes to the removable storage unit 616 in a well known manner.

The computer 602 also includes input/output/display devices 620, such as monitors, keyboards, pointing devices, touch screens, etc.

The computer 602 further includes a communication or network interface 618. The network interface 618 enables the computer 602 to communicate with remote devices. For example, the network interface 618 allows the computer 602 to communicate over communication networks or mediums 624B (representing a form of a computer useable or readable medium), such as LANs, WANs, the Internet, etc. The network interface 618 may interface with remote sites or networks via wired or wireless connections.

Control logic 626C may be transmitted to and from the computer 602 via the communication medium 624B. More particularly, the computer 602 may receive and transmit carrier waves (electromagnetic signals) modulated with control logic 626C via the communication medium 624B.

Any tangible apparatus or article of manufacture comprising a computer useable or readable medium having control logic (software) stored therein is referred to herein as a computer program product or program storage device. This includes, but is not limited to, the computer 602, the main memory 608, secondary storage devices 610, the removable storage unit 616 but not the carrier waves modulated with control logic 626C. Such computer program products, having control logic stored therein that, when executed by one or more data processing devices, cause such data processing devices to operate as described herein, represent embodiments of the invention.

Embodiments can work with software, hardware, and/or operating system implementations other than those described herein. Any software, hardware, and operating system implementations suitable for performing the functions described herein can be used. Embodiments of the invention are applicable to both a client and to a server or a combination of both.

The Summary and Abstract sections may set forth one or more but not all exemplary embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for fusing three-dimensional (3D) ground and airborne models for a geographical information system, comprising:
    (a) aligning a ground model and an airborne model relative to one another, wherein each of the ground model and the airborne model includes a respective plurality of facades, and wherein the aligning includes extracting edges of the facades from both the airborne model and the ground model and moving at least some of the extracted edges to optimize congruence between the extracted edges;
    (b) modifying three-dimensional mesh information in the ground and airborne models after the aligning to obtain modified ground and airborne models;
    (c) merging the modified ground and airborne models to obtained a fused 3D model; and
    (d) storing the fused 3D model in memory for subsequent access by the geographical information system.

2. The computer-implemented method of claim 1, wherein the aligning further includes:
    determining misalignment between a first one of the plurality of facades of the airborne model and a first one of the plurality of facades of the ground model; and
    wherein moving at least some of the extracted edges includes moving the airborne model and the ground model relative to one another to align the two first facades.

3. The computer-implemented method of claim 2, wherein the aligning further includes for successive facades:
    determining misalignment between successive one of the plurality of facades of the airborne model and respective successive ones of the plurality of facades of the ground model; and
    wherein moving at least some of the extracted edges includes additionally moving the airborne model and the ground model relative to one another to align the successive facades.

4. The computer-implemented method of claim 3, wherein the aligning further comprises adjusting bottom points of the ground and airborne models relative to terrain data of the geographical information system to align the altitude and slope of ground and airborne models.

5. The computer-implemented method of claim 3, wherein each facade comprises a surface having a top and a bottom relative to a ground location, and wherein the extracted edges are vertical edges extending between the top and bottom that define endpoints across the facade.

6. The computer-implemented method of claim 1, wherein moving at least some of the extracted edges to optimize congruence between the extracted edges includes moving endpoints of the extracted edges of facades of the ground model to optimize a consensus score measuring congruence between the extracted edges of facades of the airborne model and the ground model.

7. The computer-implemented method of claim 1, further comprising:
    (a) identifying geometry in a ground model that does not match edges of an airborne model; and
    (b) removing the identified geometry from mesh information in the ground model.

8. The computer-implemented method of claim 1, further comprising:
    (e) storing texture images of facades in the ground and airborne models;
    (f) identifying an airborne facade texture image corresponding to a ground facade texture image based on proximity; and
    (g) adjusting color differences between the airborne facade texture image and the identified corresponding ground facade texture image.

9. The computer-implemented method of claim 1, wherein the modifying three-dimensional mesh information in the ground and airborne models includes removing primitives in the mesh of the airborne model occluded by primitives in the mesh of the ground model.

10. The computer-implemented method of claim 1, wherein the merging of the modified ground and airborne models to obtained a fused 3D model includes:
 (a) appending primitives in the ground model to primitives in the airborne model;
 (b) closing any remaining gaps; and
 (c) removing any protrusions, wherein the merging includes repacking the stored texture images.

11. The computer-implemented method of claim 10, further comprising:
 (e) storing texture images of facades in the ground and airborne models.

12. A system for fusing three-dimensional (3D) ground and airborne models for a geographical information system, comprising:
 (a) at least one processor configured to carry out the method of claim 1.

13. A system for fusing three-dimensional (3D) ground and airborne models for a geographical information system, comprising:
 (a) a 3D model fuser configured to align the ground and airborne models relative to one another by extracting edges of facades from both the airborne model and the ground model and moving at least some of the extracted edges to optimize congruence between the extracted edges, modify three-dimensional mesh information in the ground and airborne models after the aligning to obtain modified ground and airborne models, and merge the modified ground and airborne models to obtained a fused 3D model; and
 (b) a storage device that stores the fused 3D model for subsequent access by the geographical information system,
 wherein each of the ground model and the airborne model includes a respective plurality of facades.

14. A computer-implemented method for fusing three-dimensional (3D) models having different resolutions, at least one 3D model having a relatively lower resolution than another 3D model, for a geographical information system, comprising:
 (a) aligning the 3D models of different resolutions relative to one another, wherein each of the ground model and the airborne model includes a respective plurality of facades, and wherein the aligning includes extracting edges of the facades from both the airborne model and the ground model and moving at least some of the extracted edges to optimize congruence between the extracted edges;
 (b) modifying three-dimensional mesh information in the 3D models after the aligning to obtain modified models;
 (c) merging the modified models to obtained a fused 3D model; and
 (d) storing the fused 3D model in memory for subsequent access by the geographical information system.

15. A computer-implemented method for fusing three-dimensional (3D) ground and airborne models for a geographical information system, comprising:
 (a) aligning the ground and airborne models relative to one another;
 (b) modifying three-dimensional mesh information in the ground and airborne models after the aligning to obtain modified ground and airborne models;
 (c) merging the modified ground and airborne models to obtained a fused 3D model;
 (d) storing the fused 3D model in memory for subsequent access by the geographical information system;
 (e) storing texture images of facades in the ground and airborne models;
 (f) identifying an airborne facade texture image corresponding to a ground facade texture image based on proximity; and
 (g) adjusting color differences between the airborne facade texture image and the identified corresponding ground facade texture image.

* * * * *